United States Patent [19]

Miyake et al.

[11] Patent Number: 5,711,894
[45] Date of Patent: Jan. 27, 1998

[54] ANTIFREEZE CONCENTRATE INCLUDING ALKOXYBENZOIC ACID

[75] Inventors: Yuji Miyake; Yasuaki Mori, both of Gifu, Japan

[73] Assignee: CCI, Co., Ltd., Gifu, Japan

[21] Appl. No.: 622,309

[22] Filed: Mar. 27, 1996

[30] Foreign Application Priority Data

Mar. 29, 1995 [JP] Japan .................................. 7-071646

[51] Int. Cl.⁶ .................................................. C09K 5/00
[52] U.S. Cl. .................................. 252/76; 252/79
[58] Field of Search .......................... 252/76, 79, 396

[56] References Cited

U.S. PATENT DOCUMENTS

| | | | |
|---|---|---|---|
| 4,209,415 | 6/1980 | Hirozawa et al. | 252/76 |
| 4,851,145 | 7/1989 | Van Neste et al. | 252/76 |

FOREIGN PATENT DOCUMENTS 61-184810  8/1986  Japan .

OTHER PUBLICATIONS

Chemical Abstracts, 100: 199751, "Effect of Thanionic Composition of Water–ethyleneglycol solutions on the Anodic Behavior of Iron", Kuznetsov et al, 1984, No Month Available.

Chemical Abstracts, 97:130191, "Antirust and Lubricity Characteristics of Cutting Fluid Additives", Watanabe et al, 1982, No Month Available.

Grant & Hackh's Chemical Dictionary, Definition of Ethoxybenzoic Acid, 1987, No Month Available.

*Primary Examiner*—Christine Skane
*Attorney, Agent, or Firm*—Thomas R. Vigil

[57] ABSTRACT

An additive to be added to coolant or antifreeze concentrate is disclosed. The additive includes at least one ingredient selected from the group consisting of alkoxybenzoic acids and their amine salts, alkali metal salts and ammonium salts.

1 Claim, No Drawings

ANTIFREEZE CONCENTRATE INCLUDING ALKOXYBENZOIC ACID

BACKGROUND OF THE INVENTION

(1) Field of the Invention

This invention generally relates to an additive to be added to antifreeze concentrate or coolant concentrate to be blended into the circulation water in heat-exchange system chiefly of internal-combustion engines. This invention more particularly relates to an additive comprising at least one ingredient selected from the group consisting of alkoxybenzoic acids and their amine salts, alkali metal salts and ammonium salts. The present invention also relates to a coolant concentrate and an antifreeze concentrate including such an additive, which are to be blended into heat-exchange water.

(2) Description of Prior Art

Japanese Patent Laid-Open Publication No. 2-182782 discloses an additive for coolant concentrate, including a straight-chain dicarboxylic acid of carbon number 7–14. The additive when included in coolant concentrate will originally function as an excellent metal corrosion inhibitor and effectively inhibit corrosion of various metals used in heat-exchange system. However, the straight-chain dicarboxylic acid included in the additive eventually promotes, by nature, oxidation of the glycol included in the concentrate as a chief component, progressively lowering the pH value of the coolant. As a result, the coolant concentrate including this additive will eventually induce metal corrosion in the cooling system in spite of the coolant additive or coolant concentrate. Further, the additive according to Japanese Patent Laid-Open Publication No. 2-182782 is not chemically stable enough with hard water, tending to produce precipitation in the coolant by chemical reaction with the hard water ingredients, which may eventually plug the fine water passages of the heat-exchange system.

BRIEF DESCRIPTION OF THE INVENTION

Accordingly, it is an object of the present invention to provide an additive to be added to coolant concentrate or antifreeze concentrate to be blended into heat-exchange water, which effectively prevents metal corrosion and oxidation of glycols, and which maintains the coolant or antifreeze properties of the concentrate and is chemically stable with hard water in heat-exchange system.

The inventors of the present invention have discovered through their long and strenuous study that alkoxybenzoic acids, and their amine salts, alkali salts and ammonium salts possess an excellent metal corrosion inhibitive power.

A coolant/antifreeze additive according to the present invention includes at least one ingredient selected from the group consisting essentially of alkoxybenzoic acids including the following chemical structure and their amine salts, alkali metal salts and ammonium salts:

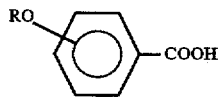

wherein "R" is an alkyl group of carbon number 1–5.

The additive of the present invention provides: (a) excellent metal corrosion inhibition; (b) glycol oxidation inhibition; and (c) excellent stability with hard water.

Both a coolant concentrate and an antifreeze concentrate according to the present invention include the foregoing additive in the range of about 0.05–8.0 wt. %. The coolant concentrate and the antifreeze concentrate of the present invention also provide an excellent metal corrosion inhibition, an excellent chemical stability with hard water, and a glycol oxidation inhibition.

DETAILED DESCRIPTION OF THE PREFERRED EMBODIMENT

A coolant/antifreeze additive of the present invention includes at least one ingredient selected from the group consisting essentially of alkoxybenzoic acids including the following chemical structure and their amine salts, alkali metal salts and ammonium salts:

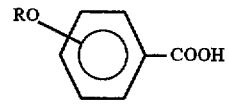

wherein "R" is an alkyl group of carbon number 1–8.

The coolant/antifreeze additive effectively prevents corrosion of iron and aluminum as well as oxidative deterioration of glycols which are generally included in coolant concentrate and antifreeze concentrate as a chief component. The coolant/antifreeze additives are chemically stable with hard water.

A coolant concentrate and an antifreeze concentrate of the present invention both include such an additive in the range of about 0.05–8.0 wt. %. When the amount of the included additive is less than the range, the performance of those coolant concentrate and antifreeze concentrate falls short of expectation, while when the amount of the included additive is more than that range, it is not economical.

The coolant concentrate and antifreeze concentrate including an amount of the additive of the present invention therefore include at least one component selected from the group consisting essentially of alkoxybenzoic acids and their various salts, and effectively inhibit corrosion of iron and aluminum. However, they do not function to inhibit corrosion of brass or copper. It is preferable to also selectively include a triazole or triazoles such as tolyltriazole, benzotriazole, and 4-phenyl-1,2,3-triazole, preferably in the range of about 0.05–1.0 wt. %.

An antifoaming agent, coloring agent, and/or pH adjusting agent may also be selectively included. Conventional metal corrosion inhibitors such as molybdic acid, tungstic acid, sulfate, nitrates, nitrites, silicates, mercaptobenzothiazole and alkali salts thereof, borates, phosphates, and benzoates and amine salts thereof may also be selectively included, preferably in the range of about 0.05–1.0 wt. % for molybdic acid, tungstic acid, sulfate, nitrates, nitrites, silicates, mercaptobenzothiazole and alkali salts thereof, about 0.05–2.0 wt. % for borates and phosphates, and about 0.5–5.0 wt. % for benzoates and amine salts thereof.

Performance Test

Five embodiment coolant concentrates (Embodiments 1–5) three of which (3–5) include an amount (0.05–8.0 wt %) of the additive of the present invention, and two comparison coolant concentrates (Comparisons 1 and 2) each including a conventional coolant additive (sebacic acid and dodecanedioic acid) were prepared. Also prepared were Comparisons 3 and 4 including an amount, below and above the range 0.05–8.0 wt. %, respectively, of the additive according to the present invention. Another comparison concentrate (Comparison 5) did not include any coolant additive. Their respective ingredients are shown in Table 1. Those embodiments should not be construed as limiting the scope of the present invention.

TABLE 1

COMPONENTS (WT.%) OF COOLANT CONCENTRATE

| Component | Embodiment | | | | | Comparison | | | | |
|---|---|---|---|---|---|---|---|---|---|---|
| | 1 | 2 | 3 | 4 | 5 | 1 | 2 | 3 | 4 | 5 |
| P-methoxybenzoic acid | 2.0 | | 2.0 | | 2.0 | | | 0.03 | 9.0 | |
| P-ethoxybenzoic acid | | 2.0 | | 2.0 | | | | | | |
| Sebacic acid | | | | | | 4.0 | 0.8 | | | |
| Dodecanedioic acid | | | | | | 1.0 | 1.7 | | | |
| Sodium benzoate | | | | | 2.0 | | | | | |
| Benzotriazole | | | | | | 0.3 | | | | |
| Tolyltriazole | | | 0.3 | 0.3 | 0.3 | | 0.1 | | | |
| Sodium nitrate | | | | | 0.2 | | | | | |
| Sodium hydroxide | | | | | | 2.7 | | | | |
| Potassium hydroxide | .86 | .95 | .99 | 1.08 | .99 | | 1.21 | .21 | 3.43 | * |
| Water | 2.0 | 2.0 | 2.0 | 2.0 | 2.0 | 3.5 | 2.0 | 2.0 | 2.0 | 2.0 |
| Ethylene glycol | 95.14 | 95.05 | 94.71 | 94.62 | 92.51 | 88.50 | 84.19 | 97.76 | 85.57 | 98.0 |
| Diethylene glycol | | | | | | | 10.0 | | | |
| pH (30 vol. %) | 7.8 | 7.8 | 7.8 | 7.8 | 7.8 | 7.5 | 8.3 | 7.8 | 7.8 | 8.1 |

*negligible

Embodiments 1–5 and Comparisons 1–5 were respectively put to a metal corrosion test. Embodiments 1–5 and Comparisons 1 and 2 were also put respectively to an oxidative deterioration test and a hard water stability test. The results are shown in Tables 2, 3 and 4.

The metal corrosion test was conducted according to JIS (JAPAN INDUSTRIAL STANDARD) K 2234-1987 (II) Standard. The coolant concentrates of Embodiments 1–5 and Comparisons 1–5 were diluted to 30 vol. % with preparation water. From each diluted concentrate a number of 750 ml test samples were prepared and respectively put into tall beakers. Then, a test metal piece of a known weight and surface area was immersed in each tall beaker. The test metal pieces used were of cast aluminum, cast iron, steel, brass, solder and copper. Dry air was blown into each beaker at a rate 100 l/min., and then each beaker was kept at temperature 88° C. for 336 hrs. The weight of the metal piece in each beaker was subsequently measured. The change in weight of each metal piece was divided by the surface area of the metal piece to obtain the metal corrosion value. This test was repeated for all test metal pieces with Embodiments 1–5 and Comparisons 1–5, respectively.

The oxidative deterioration test was conducted using a test system provided by JIS K 2234 Antifreeze 7.4 Metal Corrosion. A number of 500 ml test samples were also prepared from the foregoing diluted concentrates of Embodiments 1–5 and Comparisons 1 and 2. The pH values were measured using the 30 vol. % diluted coolant concentrates of Embodiments 1–5 and Comparisons 1 and 2 after heating them at 100° C. for 5 hrs. and then cooling them. Each test sample was put in a liter tall beaker and a test copper piece having a surface area of 800 cm$^2$ was immersed in the tall beaker. Dry air was blown into each tall beaker at a rate 100 ml/min. Each beaker was kept at temperature 120° C. for 400 hrs. The degradation product in each sample was measured (ppm) by ion chromatography as formic acid.

The hard water stability test was conducted as follows. Each coolant concentrate of Embodiments 1–5 and Comparisons 1 and 2 was diluted to 50 vol. % with hard water (1000 ppm as CaCO$_3$) which had been prepared by adding CaCl$_2$ into ion exchange water until the concentration of Ca$^{2+}$ was 400 ppm.

Those diluted concentrates were left in the dark (room temperature) for 24 hrs, The precipitation in each test sample was measured in vol. %.

TABLE 2

JIS METAL CORROSION TEST

| Change in weight | | Embodiment | | | | | Comparison | | | | |
|---|---|---|---|---|---|---|---|---|---|---|---|
| | mg/cm$^2$ | 1 | 2 | 3 | 4 | 5 | 1 | 2 | 3 | 4 | 5 |
| CastAl | ±0.30 | −.06 | −.09 | −.05 | −.18 | −.03 | −.02 | −.32 | −.70 | −.01 | −1.32 |
| CastFe | ±0.30 | −.02 | +.02 | .00 | +.03 | +.02 | −.01 | −.01 | −17.44 | +.01 | −23.12 |
| Steel | ±0.15 | −.03 | .00 | −.04 | +.02 | −.01 | +.01 | .00 | −10.52 | −.03 | −13.63 |
| Brass | ±0.15 | −.47 | −.41 | −.02 | −.03 | −.03 | −.07 | −.07 | −.53 | −.35 | −.43 |
| Solder | ±0.30 | −.12 | −.15 | −.06 | −.01 | −.08 | −.08 | −.18 | −10.19 | −.20 | −25.48 |
| Copper | ±0.15 | −.39 | −.33 | −.07 | −.08 | −.04 | −.05 | −.27 | −.41 | −.34 | −.31 |
| pH (after) | 7.0–11.0 | 7.9 | 7.9 | 8.1 | 8.1 | 8.0 | 7.4 | 7.7 | 6.5 | 8.0 | 5.9 |

TABLE 2-continued

JIS METAL CORROSION TEST

| Change in weight | Embodiment | | | | | Comparison | | | | |
|---|---|---|---|---|---|---|---|---|---|---|
| mg/cm² | 1 | 2 | 3 | 4 | 5 | 1 | 2 | 3 | 4 | 5 |
| Appearance Metal piece (after) | *N | N | N | N | N | N | N | ** | N | ** |
| Appearance Sample (after) | N | N | N | N | N | N | N | N | N | N |

*N = Normal
**Generally Corroded (Cast Iron/Steel/Solder) Locally Corroded (Cast Aluminum)

TABLE 3

OXIDATIVE DETERIORATION TEST

| | Embodiment | | | | | Comparison | |
|---|---|---|---|---|---|---|---|
| | 1 | 2 | 3 | 4 | 5 | 1 | 2 |
| Change in pH | -1.7 | -1.7 | -1.5 | -1.4 | -1.3 | -3.7 | -3.3 |
| Degradation Product (ppm) | 4200 | 4500 | 3100 | 3000 | 2600 | 37500 | 17100 |

TABLE 4

HARD WATER STABILITY TEST

| | Embodiment | | | | | Comparison | |
|---|---|---|---|---|---|---|---|
| | 1 | 2 | 3 | 4 | 5 | 1 | 2 |
| Precipitation (v/v %) | 0.0 | 0.0 | 0.0 | 0.0 | 0.0 | 0.9 | 8.0 |

From the results of those tests it can be said that the antifreeze/coolant additive according to the present invention: (a) possesses an excellent metal corrosion preventive power; (b) is stable in hard water; and (c) does not produce precipitation with hard water. The additive of the present invention inhibits oxidation deterioration of glycols, and does not cause lowering of the pH values, also effectively preventing metal liquation and corrosion.

Accordingly, the antifreeze concentrate and the coolant concentrate including an antifreeze/coolant additive of the present invention in the range 0.05-8.0 wt. % possess an excellent metal corrosion preventive power. The concentrates are stable in hard water, and do not produce precipitation in hard water. The concentrates inhibit oxidative deterioration of glycols, and do not cause lowering of the pH value in use, also effectively preventing metal liquation and corrosion.

While the present invention has been described by reference to specific embodiments, it should be understood that modifications and variations of the present invention may be made without departing from the scope of the invention defined in the following claims.

What is claimed is:

1. A coolant or antifreeze concentrate having corrosion inhibiting properties consisting essentially of:

a major amount of at least one glycol (b) at least one ingredient selected from the group consisting of (1) benzoic acids, substituted by alkoxy of carbon number 1-5, (2) the amine salts thereof, (3) the alkali metal salts thereof and (4) the ammonium salts thereof in an amount of 0.05-8.0% by weight; and, (c) at least one in an amount of 0.05-1.0% by weight.

* * * * *

UNITED STATES PATENT AND TRADEMARK OFFICE
CERTIFICATE OF CORRECTION

PATENT NO. : 5,711,894
DATED : January 27, 1998
INVENTOR(S) : Yuji Miyake and Yasuaki Mori It is certified that error appears in the above-indentified patent and that said Letters Patent is hereby corrected as shown below:

Column 2, line 20, "1-8" should be --1-5--.

Column 3, line 37, delete ",", second occurrence.

Column 4, line 46, "," should be --.--.

Column 6, line 36, before "a", insert --(a)--;

line 42, after "one" insert --triazole--.

Signed and Sealed this

Fourth Day of August, 1998

*Attest:*

*Attesting Officer*

BRUCE LEHMAN
*Commissioner of Patents and Trademarks*